United States Patent
Xiang

(10) Patent No.: US 8,073,435 B2
(45) Date of Patent: Dec. 6, 2011

(54) SYSTEM AND METHOD FOR PROVIDING QUALITY OF SERVICE IN A COMMUNICATION NETWORK

(75) Inventor: Zhixian Xiang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1453 days.

(21) Appl. No.: 11/496,972

(22) Filed: Jul. 31, 2006

(65) Prior Publication Data

US 2007/0042771 A1    Feb. 22, 2007

Related U.S. Application Data

(60) Provisional application No. 60/709,997, filed on Aug. 19, 2005.

(51) Int. Cl.
*H04M 3/42*     (2006.01)

(52) U.S. Cl. ............... 455/414.3; 455/412.1; 455/412.2; 455/414.1; 455/415; 455/410; 455/411; 455/404.2; 455/408

(58) Field of Classification Search .................. 455/433, 455/432.2, 435.2
See application file for complete search history.

(56) References Cited

U.S. PATENT DOCUMENTS

| 2002/0037722 A1 * | 3/2002 | Hussain et al. ............... 455/435 |
| 2002/0085516 A1 | 7/2002 | Bridgelall |

FOREIGN PATENT DOCUMENTS

| JP | 2005-192163 | 7/2005 |
| JP | 2003434710 A1 * | 7/2005 |
| WO | WO 2004/071111 | 8/2004 |

* cited by examiner

*Primary Examiner* — Charles Appiah
*Assistant Examiner* — Randy Peaches
(74) *Attorney, Agent, or Firm* — Slater & Matsil, L.L.P.

(57) ABSTRACT

Method and system for providing quality of service in communication network. According to an embodiment, the present invention provides a communication network system. The communication network system includes a first entity that is configured to store information on a first database and to provide first network access information. The first database is configured to store at least the first network access information. The system also includes a mobile station that is capable of sending and receiving first data via a wireless connection, the mobile station that is capable of sending one or more requests for a service flow. The system also includes a second entity that is configured to provide wireless access to the mobile station. The second entity is capable of exchanging information with the first entity. The second entity includes a second database, which is configured to store at least second network access information.

35 Claims, 4 Drawing Sheets

SYSTEM AND METHOD FOR PROVIDING QUALITY OF SERVICE IN A COMMUNICATION NETWORK

CROSS-REFERENCES TO RELATED APPLICATIONS

This application claims priority to U.S. Provisional Application No. 60/709,997 filed Aug. 19, 2005, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a method and system for determining quality of service (QoS) in a communication networks. Merely by way of example, the invention is described as it applies to wireless access network and content provider, but it should be recognized that the invention has a broader range of applicability.

Techniques for wireless communications have progressed through the years. For example, satellite wireless communication networks have been developed where satellites are use to relay voice communication among wireless. There are other techniques as well. Over the recent years, the "cellular" wireless communication networks have become one of the most widely used technique for providing wireless communication.

A wireless network usually includes base stations and mobile stations. For example, a mobile station (MS) refers to a station that is to be used while in motion or during halts at unspecified geographic locations. As an example, the mobile station is a mobile communication device. In another example, the mobile station is a cellular phone. In yet another example, a base station (BS) refers to a set of equipment that can provide connectivity, management, and control for one or more mobile stations. As merely an example, a connective service network refers to a set of network functions that provide IP connectivity services to mobile stations. In an exemplary process flow, a MS obtains radio access from a BS. Through the BS, the MS obtains IP services. Typically, the QoS for an MS is determined by the connective service network. The term QoS is broadly defined. For example, the term QoS refers to the performance specification of a communications channel or system.

Therefore, an improved method for providing wireless communication network is desired.

BRIEF SUMMARY OF THE INVENTION

The present invention relates in general to telecommunication techniques. More particularly, the invention provides a method and system for determining quality of service (QoS) in a communication networks. Merely by way of example, the invention is described as it applies to wireless access network and content provider, but it should be recognized that the invention has a broader range of applicability.

According to an embodiment, the present invention provides a communication network system. The communication network system includes a first entity that is configured to store information on a first database and to provide first network access information. The first database is configured to store at least the first network access information. The system also includes a mobile station that is capable of sending and receiving first data via a wireless connection, the mobile station that is capable of sending one or more requests for a service flow. The system also includes a second entity that is configured to provide wireless access to the mobile station. The second entity is capable of exchanging information with the first entity. The second entity includes a second database, which is configured to store at least second network access information. The second network access information is a subset of the first network access information. The second entity also includes a base station that is configured to wirelessly exchange second data with the mobile station. The second entity additionally includes a logical component that is configured to determine at least an authorization for the mobile station in response to the one or more requests for the service flow. The step of determining an authorization includes obtaining a profile from the second database.

According to another embodiment, the present invention provides a system for providing network access to one or more mobile stations based on one or more policies. The system includes a network interface component. The system also includes a first component that is configured to provide a wireless network access to the one or more mobile stations. The system additionally includes a database that is configured to obtain the one or more policies from a policy database. The policy database is a part of a management system. For example, at least one of the one or more policies are related to at least one of the one or more mobile stations. The database is further configured to store the one or more policies. The system also includes a logical component being configured to determining an authorization for at least one of the one or more mobile stations in response to a service flow request. The authorization is associated with at least one of the one or more policies stored at the database.

According to yet another embodiment, the present invention provides a method for allocating network resource by a first entity. For example, the first entity is configured to provide an access to at least one mobile station. The method includes a step for obtaining information associated with a network access from a second entity. For example, the second entity is configured to store information on a database and to provide network access information. The method additionally includes a step for storing the obtained information to a local database of the first entity, and the stored information including a profile. Also, the method includes a step for receiving a network access request from a mobile station, the network access request being related to at least one service flow. The method additionally includes a step for retrieving at least the profile related to the network access request from the local database. The method further includes a step for processing the information associated with the profile. The method also includes a step for determining an authorization based on at least information associated with the profile. Also, the method includes a step for responding to the network access request based on the authorization.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a method and system for determining quality of service (QoS) in a communication networks. Merely by way of example, the invention is described as it applies to wireless access network and content provider, but it should be recognized that the invention has a broader range of applicability.

Figure 1:
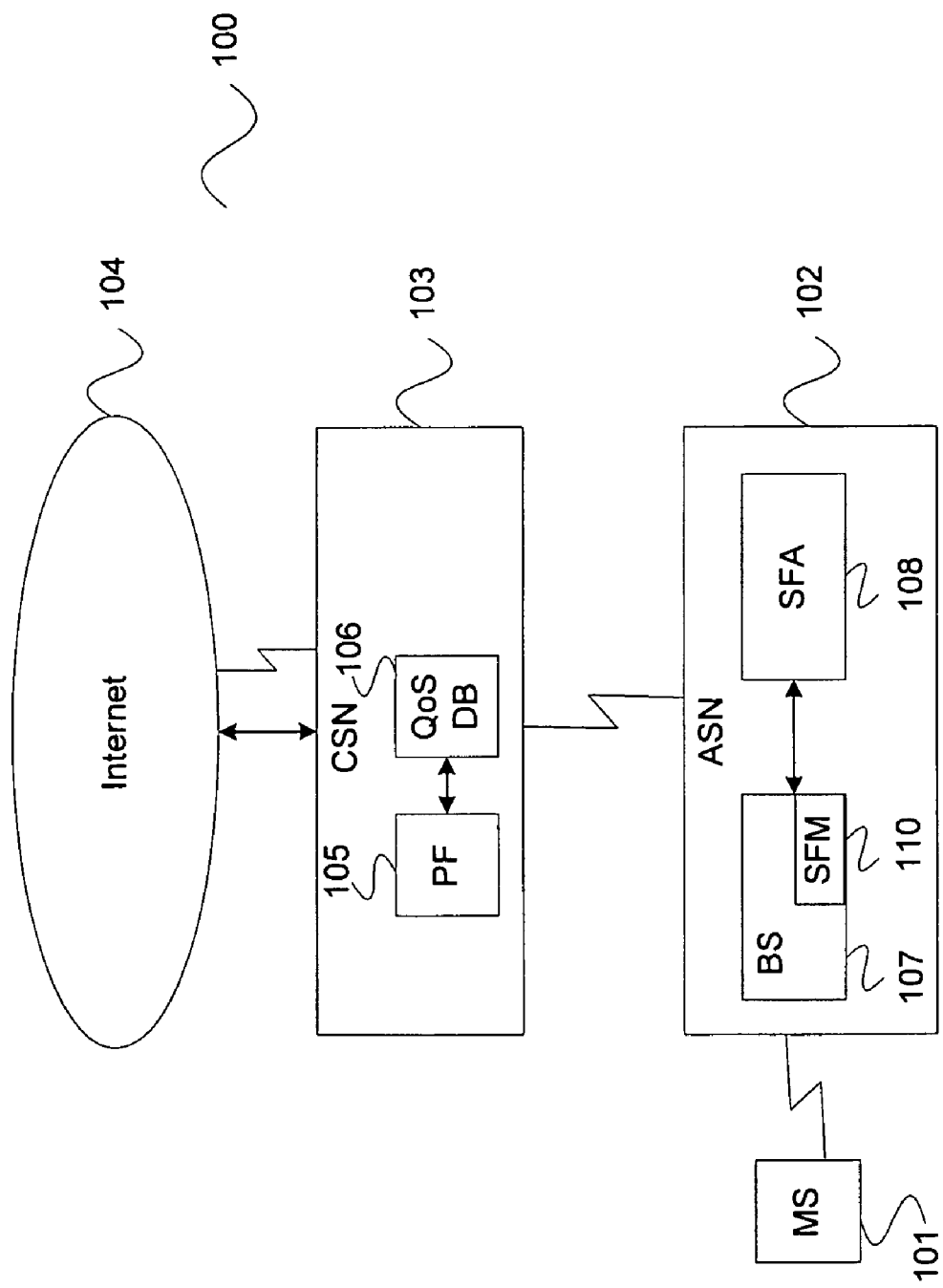
FIG. 1 is a simplified diagram of a conventional wireless communication network.

As explained above, wireless communication networks are widely used in the recent years to provide wireless services. FIG. 1 is a simplified diagram of a conventional wireless communication network. This diagram is merely an example, which should not unduly limit the scope of the claims. One of ordinary skill in the art would recognize many variations, alternatives, and modifications.

A communication network 100 includes, among other things, a connectivity service network (CSN) 103 and an access service network (ASN) 102. For example, the communication network is a WiMAX network, which refers to the network architecture base on, for example, IEEE802.16d/e wireless standard. For example, the CSN is the network of mobile cellular phone service provider. As merely an example, the ASN 102 is a base station that provides radio access for mobile stations. According to a specific embodiment, CSN refers to a set of network functions that provide IP connectivity services to mobile station which has IP connectivity capability. For example, the CSN 103 is connected to the Internet and is able to provide a mobile station 101 that is connected to the ASN 102 with data services. As another example, the CSN 103 is connected to other types of networks, such as video conference network, directory service network, etc. Merely by way of an example, the CSN 103 is configured to provide content information by itself to mobile stations.

According to a specific embodiment, the CSN 103 includes a network interface for the Internet 104 and a network interface to connect to the ASN 102. Depending upon application, the network interfaces may be wire connection (e.g., Ethernet, optical network, etc.) and/or wireless connection. For example, the CSN 103 is connected to the Internet via optical network and is connected to the ASN via a wireless network.

The CSN 103 includes, among other things, a policy function (PF) component 105 and a QoS database component 106. The CSN 103 stores at various QoS policies for mobile stations. As merely an example, the PF component 105 is referred to a central logical/physical function entity, which resides in the MS's home CSN 103, and authorizes and communicates appropriate service flow actions to a service flow authority (SFA) component against a provisioned QoS profile and policies for allowed services of the MS. As an example, QoS policies are stored at the QoS database component 106, which stores all the policies of mobile stations subscribed to the CSN 103.

Mobile stations, such as the mobile station 101, connect to the communication network 100 through the ASN 102. According to various embodiments, the ASN 102 is configured to provide radio access to mobile stations with its service area (e.g., areas within the reach of wireless radio network, etc.), and to relay voice and/or data service flow between the mobile station and the CSN 103. The ASN 102 includes, among other things, a base station (BS) 107 and an SFA component 108. For example, base station (BS) refers to general equipment set for providing connectivity, management, and control of mobile stations. As merely an example, the BS 107 includes a service flow management (SFM) component 110. For example, the term SFM is broadly defined and refers to a logical entity configured for the creation, admission, activation, modification and deletion of service flows after getting authorization from an SFA component. As merely an example, the term SFM is broadly defined and refers to a logical/physical entity that communicates with the PF of a CSN to authorize service flow actions, and to receive service flow requests.

Typically, for various wireless network technologies (e.g., WiMAX, etc.), each MS is able to maintain multiple service flows (e.g., data service flow, voice service flow, etc.) with one BS. For example, each of the service flows is associated with a particular application with special performance and transport requirement. The service flow creation, modification and deletion can be triggered by MS or network. In order for particular MS to create or modify the service flow, the service flow creation/modification request has to be authorized against the QoS profile or policy associated with that MS. In a conventional wireless network, such as WiMAX network, the service flow request often can only be authorized by one service flow management entity, which is PF and resides in CSN. CSN is different from access service network with BS.

Figure 2:
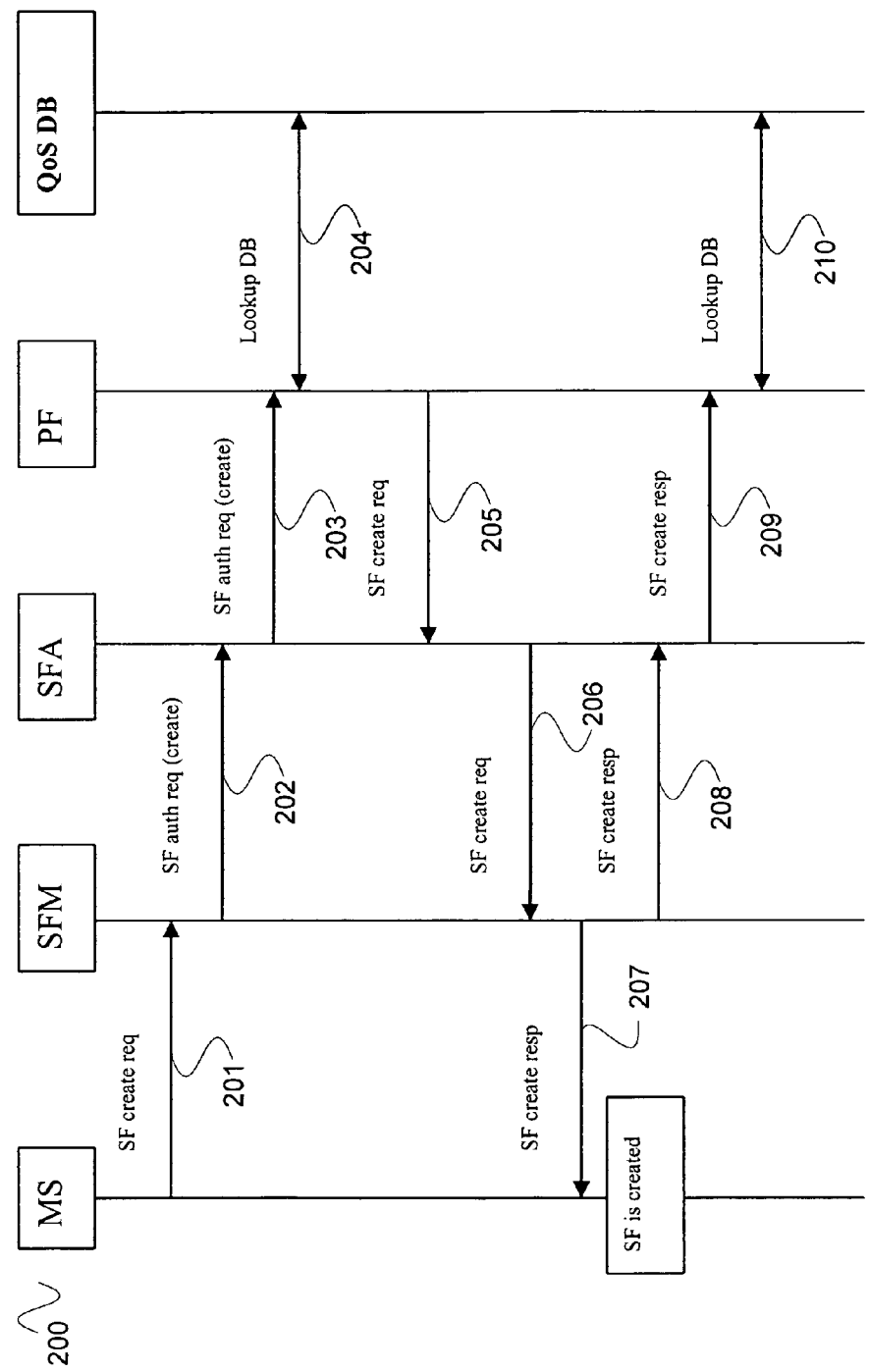
FIG. 2 is a simplified diagram of a conventional technique for QoS service flow operation.

FIG. 2 is a simplified diagram of a conventional technique for QoS service flow operation. This diagram is merely an example, which should not unduly limit the scope of the claims. One of ordinary skill in the art would recognize many variations, alternatives, and modifications.

A flowchart 200 illustrates a typical process for creation and use of a service flow (SF) according to the conventional techniques.

At step 201, a mobile station sends a service flow request to the SFM. For example, the mobile station 101 in FIG. 1 has already been connected to the BS 107 for voice service and is requesting for additional SF (e.g., data SF, etc.).

At step 202, the SFM sends a SF authorization request to the SFA. For example, the SFM requests the SFA to create a service flow for the mobile station, provided that the requested is authorized according to existing QoS profile for the requesting mobile station.

At step 203, the SFA sends the SF authorization request to the PF, which is a part of the CSN. For example, the SFA modifies the relay the SF authorization request and sends the modified SF authorization request through wired connection.

At step 204, the PF determines a QoS policy by looking up a QoS database. Depending upon application, the QoS database can be a sub-component of the PF or a separate component of the CSN.

At step 205, the PF sends SF authorization and/or request for SF creation request to the SFA based on the QoS policy. For example, the PF sends the SF authorization and/or request for SF creation request via wired connection. As another example, the PF sends the SF authorization and/or request for SF creation request through wireless connection.

At step 206, the SFA sends the SF authorization and/or request for SF creation request to the SFM. For example, the SFA authorizes the SFM to create a SF for the requesting MS.

At step 207, the SFM creates SF for the MS based on the received authorization. For example, the SFM allocates a predetermined amount of available bandwidth for the requesting MS based on the authorization.

At step 208, the SFM sends a message to SFA to indicate that a SF has been created for the requesting MS.

At step 209, the SFA sends a message, which may be the same message from the SFM or a modified message, to the PF to indicate that the SF has been created.

At step 210, the PF looks up the QoS database and/or update the QoS profile. For example, if the requesting mobile station is associated with a prepaid account, certain amount of credit is deducted from the QoS profile for that mobile station.

As can be seen from the flowchart 200, the process of creating a SF for a MS is time consuming and often inefficient. For example, a request for SF according to the above-mentioned techniques must go through both the ASN and the CSN. As a result, a response to a request for SF often causes delays. In addition, transmitting service requests back and forth results in an inefficient use of network bandwidth.

Therefore, it is to be appreciated that according to various embodiments, the present invention provides an improved and more efficient method for determining QoS. More specifically, certain embodiments of the present invention reduce numbers of steps and the amount of time that are required for the creation of a service flow.

Figure 3:
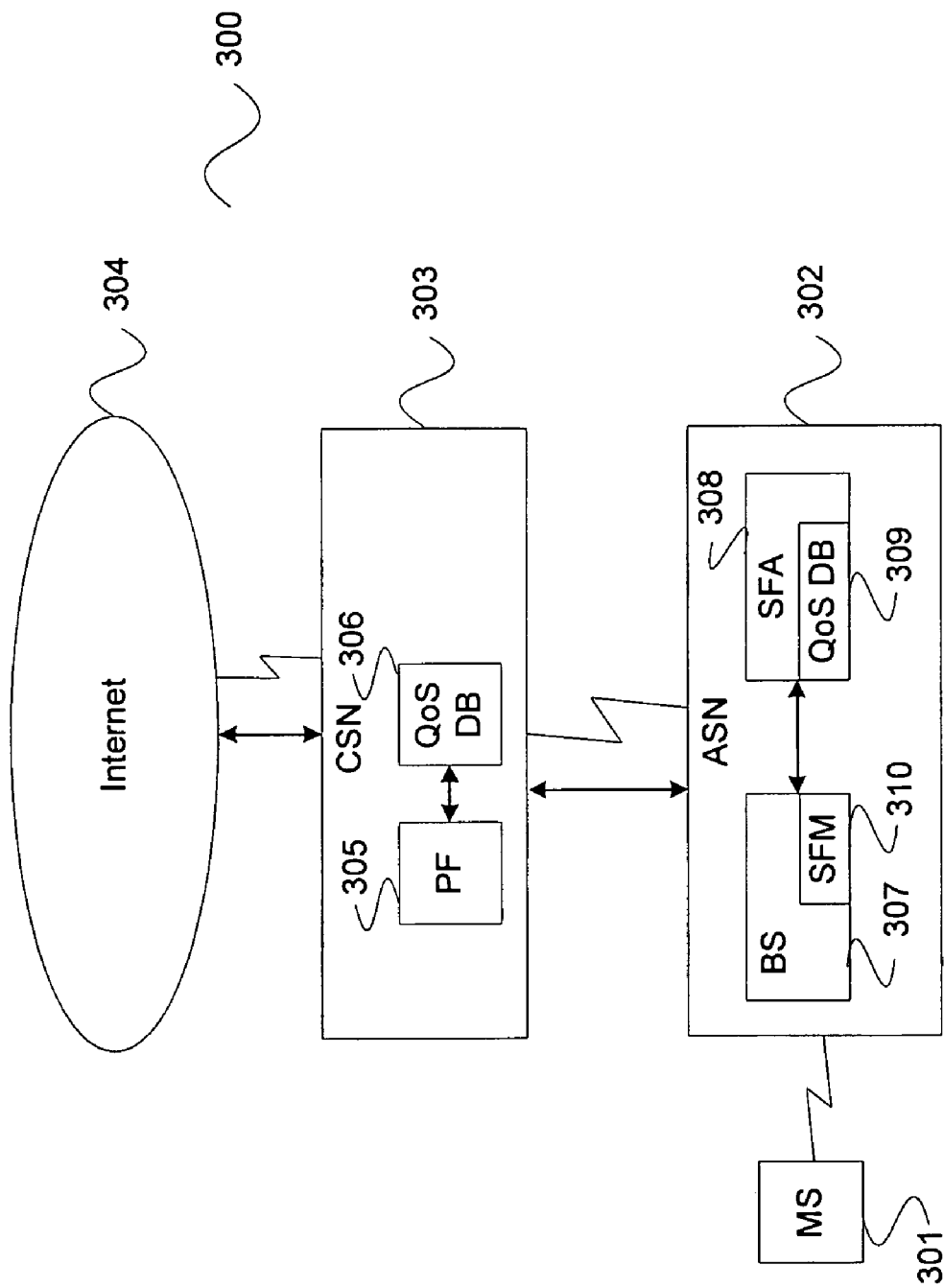
FIG. 3 is a simplified diagram illustrating a communication network according to an embodiment of the present invention.

FIG. 3 is a simplified diagram illustrating a communication network according to an embodiment of the present invention. This diagram is merely an example, which should not unduly limit the scope of the claims. One of ordinary skill in the art would recognize many variations, alternatives, and modifications.

According to a specific embodiment, a communication network 300 includes, among other things, a connectivity service network (CSN) 303 and an access service network (ASN) 302. For example, the communication network 300 is a WiMAX network, which refers to the network architecture base on, for example, IEEE802.16d/e wireless standard. It is to be appreciated that the present invention may be practice in accordance with other types of network architectures as well.

As an example, the CSN 303 is the network provided by the mobile cellular phone service provider. It is to be understood that CSN 303 may be configured to provide other types of network services (e.g., telephony, DSL, etc.). As merely an example, the ASN 302 is a base station that provides radio access for mobile stations. According to a specific embodiment, CSN 303 refers to a set of network functions that provide IP connectivity services to mobile station which has IP connectivity capability. For example, the CSN 303 may be characterized as a content network provider. Depending upon applications, other terminologies may be used to describe "CSN" and the term should not unduly limit the scope of the claims. For example, the CSN 303 is connected to the Internet and is able to provide a mobile station 301 that is connected to the ASN 302 with data services. As another example, the CSN 303 is connected to other types of networks, such as video conference network, directory service network, etc. Merely by way of an example, the CSN 303 is configured to provide content information by itself to mobile stations.

According to a specific embodiment, the CSN 303 is includes a network interface for the Internet 104 and a network interface to connect to the ASN 302. Depending upon application, the network interfaces may be wire connection (e.g., Ethernet, optical network, etc.) and/or wireless connection. For example, the CSN 303 is connected to the Internet via optical network and is connected to the ASN 302 via a wireless network.

The CSN 303 includes, among other things, a policy function (PF) component 305 and a QoS database component 106. The CSN 303 stores at various QoS policies for mobile stations. As an example, a QoS policy includes specific information associated with a particular mobile station and/or user. As merely an example, the PF component 305 is referred to a central logical/physical function entity, which resides in the MS's home CSN 303, and authorizes and communicates appropriate service flow actions to a service flow authority (SFA) component against a provisioned QoS profile and policies for allowed services of the MS. As an example, QoS policies are stored at the QoS database component 306, which stores all the policies of mobile stations subscribed to the CSN 303.

Mobile stations, such as the mobile station 301, connect to the communication network 300 through the ASN 302. According to various embodiments, the ASN 302 is configured to provide radio access to mobile stations with its service area (e.g., areas within the reach of wireless radio network, etc.), and to relay voice and/or data service flow between the mobile station and the CSN 303. For example, the ASN 302 may be characterized as network access provider. The ASN 302 includes, among other things, a base station (BS) 307 and an SFA component 308. For example, base station (BS) refers to general equipment set for providing connectivity, management, and control of mobile stations. As merely an example, the BS 307 includes a service flow management (SFM) component 310. For example, the term SFM is broadly defined and refers to a logical entity configured for the creation, admission, activation, modification and deletion of service flows after getting authorization from an SFA component 308. As merely an example, the term SFA is broadly defined and refers to a logical/physical entity that communicates with the PF of a CSN to authorize service flow actions, and to receive service flow requests.

According to a specific embodiment of the present invention, the SFA component 308 includes a local database 309. For example, the local database 309 includes a subset of QoS profiles from the QoS database 306. As merely an example, the local database 309 periodically obtains QoS profiles from the QoS database 306 via the PF 305. It is to be appreciated that according to certain embodiments, the local database 309 may be implemented in various ways. For example, the local database 309 may be implemented as a separate component of the ASN 302.

According to a specific embodiment, the PF 305 and/or any other entities (such as the QoS database 306) of the CSN 303 contains QoS profiles or policies, which can be populated to the SFA with the QoS profile and policy associated with mobile stations based on the policies. For example, after a particular mobile station is authenticated successfully, the SFA stores these QoS profile and policy in its local QoS database. As an example, when the mobile station that is associated with the SFA component 308 initiates a service flow creation modification request, the SFA component 308 is allowed to authorized the service flow locally according the QoS policy stored at the local QoS database 309. The SFA component 308 determines whether to authorize the service flow action according to the appropriate QoS profile and/or policy. Depending upon application, other factors, such as the network load and air-interface resource condition may also be considered. After authorization process is completed locally, the SFA component 309 sends update information to PF component 305 of the CSN 303. Based on the update information, the PF component 305 updates the QoS database 306 for the requesting mobile station.

Figure 4:
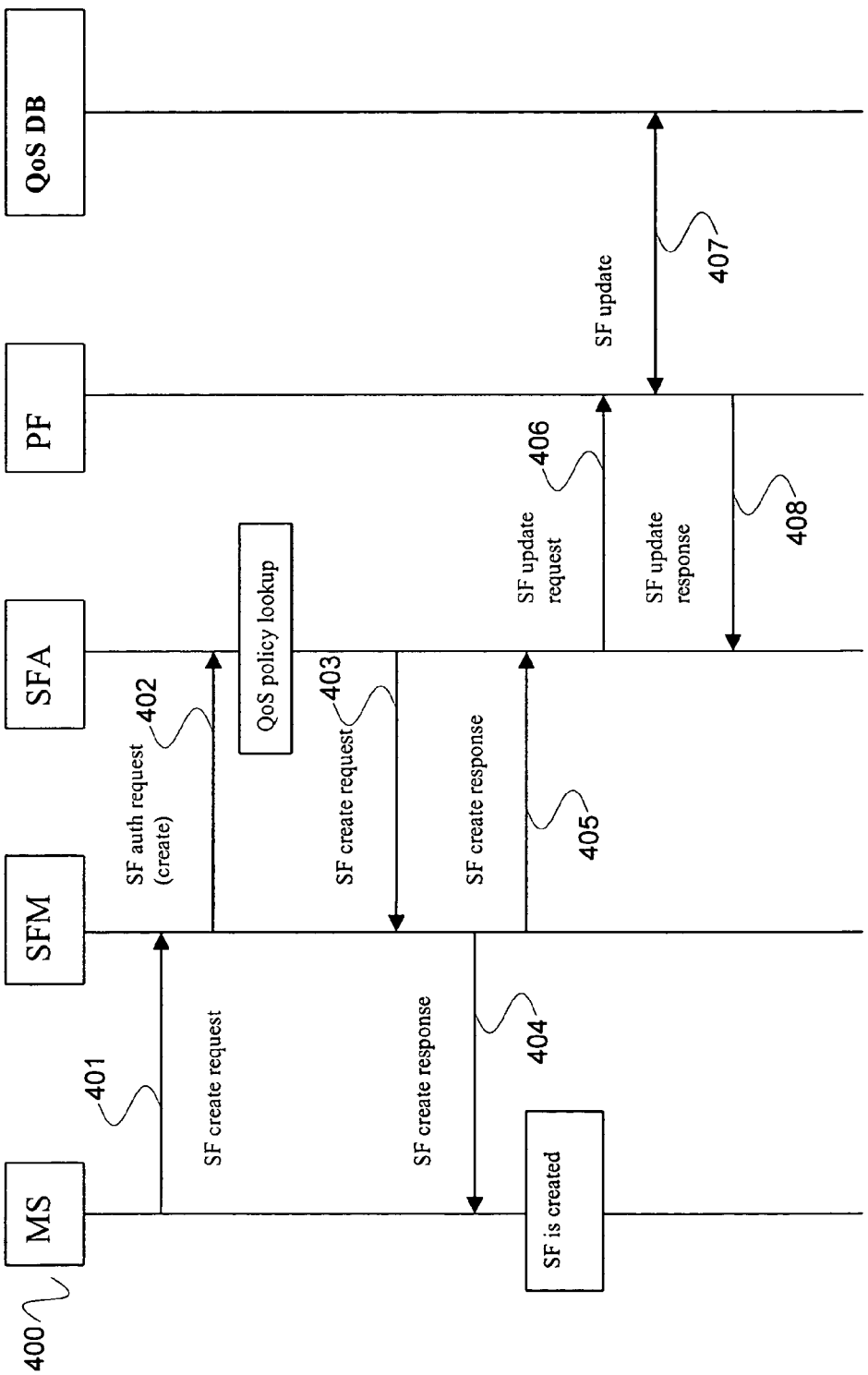
FIG. 4 is a simplified diagram illustrating a QoS authorization process according to an embodiment of the present invention.

FIG. 4 is a simplified diagram illustrating a QoS authorization process according to an embodiment of the present invention. This diagram is merely an example, which should not unduly limit the scope of the claims. One of ordinary skill in the art would recognize many variations, alternatives, and modifications. For example, various steps as illustrated in the diagram may be added, removed, modified, repeated, overlapped, and/or partially overlapped.

A flowchart 400 illustrates a typical process for creation and use of a service flow (SF) according to an embodiment of the present invention.

At step 401, a mobile station sends a message requesting creation and/or modification of a service flow to the SFM component. According to an embodiment, the message includes a universal identification for the mobile station. For example, the universal identification is a MAC address for the mobile station.

At step 402, the SFM component sends the message requesting SF from the mobile station to the SFA component of the ASN. Depending upon applications, the SFM component may or may not modify the message. For example, the SFM component modifies the message so that the message conforms to the WiMAX architecture.

The SFA component, upon receiving the message requesting SF, determines how or whether to authorize requested SF based on QoS profiles stored at the local QoS database. For example, the local database includes QoS profiles that are obtained from the QoS database of the CSN. Depending upon application, the local QoS database 309 may obtain QoS profiles from the QoS database 306 of the CSN by periodically polling the QoS database 306. According to an embodiment, the local QoS database 309 receives QoS profiles from QoS update session. It is to be appreciated that the local QoS database 309 may obtain and/or receive QoS profiles in various ways.

In addition to looking up the QoS profiles stored at the local database 309, the SFA component 308 may also determine whether to authorize the requested SF based on other factors, such as network load, air interference, etc.

At step 403, the SFA component sends a response message, which indicates whether requested SF is authorized or denied, to the SFM component.

At step 404, the SFM component responds to the mobile station. For example, if the requested SF is authorized, a SF is created for the mobile station. As merely an example, the BS station allocates necessary network resources for the authorized SF and establish necessary network path for the SF.

At step 405, the SFM component sends a message to the SFA component. According to a specific embodiment, the message indicates whether the authorized SF is properly created. For example, the message simply provides an acknowledgement for the SFA component. According to an embodiment, the SFA component updates the local QoS database. For example, the local QoS database is updated to reflect the SF created by the SFM component.

At step 406, the SFA component sends a message to the PF component of the CSN. For example, the message is used to indicate that SF has been created for the mobile station.

At step 407, the PF component updates the QoS database 306 of the CSN. For example, the QoS database 306 is updated to reflect the SF created for the mobile station for the appropriate network management. As merely an example, the QoS database 306 updates the QoS policy for the mobile station (e.g., deducting available credit for the mobile station, etc.).

At step 407, the PF component sends a message to the SPFA component of the CSN to indicate the QoS database 306 has been updated.

It is to be understood that FIG. 4 merely provides an example. For example, step 408 may be skipped. As an example, other steps may be added, removed, modified, repeated, overlapped, and/or partially overlapped.

According to an embodiment, the present invention provides a communication network system. The communication network system includes a first entity that is configured to store information on a first database and to provide first network access information. The first database is configured to store at least the first network access information. The system also includes a mobile station that is capable of sending and receiving first data via a wireless connection, the mobile station that is capable of sending one or more requests for a service flow. The system also includes a second entity that is configured to provide wireless access to the mobile station. The second entity is capable of exchanging information with the first entity. The second entity includes a second database, which is configured to store at least second network access information. The second network access information is a subset of the first network access information. The second entity also includes a base station that is configured to wirelessly exchange second data with the mobile station. The second entity additionally includes a logical component that is configured to determine at least an authorization for the mobile station in response to the one or more requests for the service flow. The step of determining an authorization includes obtaining a profile from the second database. For example, the system is illustrated according to FIG. 3.

According to another embodiment, the present invention provides a system for providing network access to one or more mobile stations based on one or more policies. The system includes a network interface component. The system also includes a first component that is configured to provide a wireless network access to the one or more mobile stations. The system additionally includes a database that is configured to obtain the one or more policies from a policy database. The policy database is a part of a management system. For example, at least one of the one or more policies are related to at least one of the one or more mobile stations. The database is further configured to store the one or more policies. The system also includes a logical component being configured to determining an authorization for at least one of the one or more mobile stations in response to a service flow request. The authorization is associated with at least one of the one or more policies stored at the database. For example, the system is illustrated according to FIG. 3.

According to yet another embodiment, the present invention provides a method for allocating network resource by a first entity. For example, the first entity is configured to provide an access to at least one mobile station. The method includes a step for obtaining information associated with a network access from a second entity. For example, the second entity is configured to store information on a database and to provide network access information. The method additionally includes a step for storing the obtained information to a local database of the first entity, and the stored information including a profile. Also, the method includes a step for receiving a network access request from a mobile station, the network access request being related to at least one service flow. The method additionally includes a step for retrieving at least the profile related to the network access request from the local database. The method further includes a step for processing the information associated with the profile. The method also includes a step for determining an authorization based on at least information associated with the profile. Also, the method includes a step for responding to the network access request based on the authorization. For example, the method is illustrated according to FIG. 4.

It is to be appreciated that the various embodiments of the present invention provide advantages over conventional techniques. For example, an embodiment of the present invention reduces the number of steps required for determining a QoS policy for a service flow request. In addition, various embodiments of the present invention reduce the network traffic flow between a connectivity service network and an access service network, improving the overall network performance thereof. As an example, an embodiment reduces the amount of time to provide service flow for a mobile station. It is to be appreciated that there are other advantages as well. Moreover, the present invention may be easily implemented for existing network architectures.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A communication network system, the communication network system comprising:
    a connectivity service network (CSN) configured to store information on a first database and to provide a first network access information, the first database being configured to store at least the first network access information, wherein the first database comprises all policies of mobile stations subscribed to the CSN, wherein the policies comprise information required to create/modify service flows to the mobile stations;
    an access service network (ASN) configured to provide wireless access to a mobile station; and
    wherein the ASN includes:
        a second database, the second database being configured to store at least a second network access information, the second network access information being a subset of the first network access information, wherein the first and the second network access information comprise information required to authorize a service flow to the mobile station;
        a base station comprising a service flow management (SFM) component and being configured to wirelessly exchange second data with the mobile station;
        a logical component including a service flow authorization (SFA) component, the SFA component being configured to determine at least an authorization for the mobile station in response to one or more requests for the service flow from the mobile station, the determining an authorization including obtaining a profile from the second database, wherein the profile comprises quality of service information, and wherein the authorization is associated with the quality of service information, wherein the SFM component is configured for creation, admission, activation, modification, and deletion of service flows based on authorization from the SFA component.

2. The communication network system of claim 1 wherein the profile is associated with the mobile station.

3. The communication network system of claim 1 wherein the profile is associated with a subscriber of the CSN.

4. The communication network system of claim 1 wherein the ASN is configured to exchange information with the CSN, and wherein the ASN is capable of providing internet access to the mobile station through the CSN.

5. The communication network system of claim 1 wherein the second data comprise voice data.

6. The communication network system of claim 1 wherein the second data comprise IP data.

7. The communication network system of claim 1, wherein the mobile station is capable of sending and receiving the first data via a wireless connection, the mobile station being capable of sending the one or more requests for the service flow.

8. The communication network system of claim 1, wherein the second database is configured to be periodically updated from the first database.

9. A method for allocating network resource by a access service network (ASN), the ASN being configured to provide wireless access to at least one mobile station, the method comprising:
    obtaining authorization information associated with a network access from a connectivity service network (CSN), the CSN being configured to store and manage authorization information on a database and to provide network access information, wherein the database in the CSN comprises all policies of mobile stations subscribed to the CSN, wherein the policies comprise information required to create/modify service flows to the mobile stations;
    storing the obtained authorization information to a local database of the ASN, the stored authorization information including a profile;
    receiving a network access request from a mobile station at the ASN, the network access request being related to at least one service flow, the request being wirelessly received at a base station within the ASN, wherein the base station comprises a service flow management component, wherein the service flow management component is configured for creation, admission, activation, modification, and deletion of service flows based on authorization from the SFA component;
    retrieving at least the profile related to the network access request from the local database;
    at the ASN, processing the authorization information associated with the profile;
    at the ASN, determining an authorization based on the processing; and
    using the service flow management component, responding to the network access request based on the authorization.

10. The method of claim 9 wherein the determining the authorization comprises determining air interference associated with communication between the mobile station and the ASN.

11. The method of claim 9 wherein the determining the authorization comprises determining a network load of the ASN.

12. The method of claim 9 wherein the network access request comprises a universal identification of the mobile station.

13. The method of claim 9 wherein the network access request comprises a MAC address of the mobile station.

14. The method of claim 9 further comprising determining an available amount of network resource at the ASN.

15. The method of claim 9 wherein the network access request comprises a request for two or more service flows.

16. The method of claim 9 wherein the network access request comprises a request for voice service flow.

17. The method of claim 9 wherein the network access request comprises a request for data service flow.

18. The method of claim 9 wherein the network access request comprises wireless signals transmitted over air.

19. The method of claim 9 wherein the ASN comprises a service flow authorization component, and wherein the CSN comprises a policy function unit.

20. The method of claim 9 wherein the profile in the local database is periodically updated with the database of the CSN.

21. The method of claim 9 wherein the CSN comprises a database, the database being configured to store quality of service information.

22. The method of claim 9 further comprising:
updating the local database with an updated profile related to the network access request;
sending an update message from the ASN to the CSN, the updated message being associated with the network access request and the profile; and
updating the database at the CSN with the updated profile.

23. The method of claim 22 wherein the update message comprises a universal identification for the mobile station.

24. A communication network system, the communication network system comprising:
a access service network (ASN), the ASN being a network of a network access provider configured to provide wireless access to a mobile station, wherein the mobile station is a subscriber of a service provider,
wherein a network of the service provider forms a connectivity service network (CSN), wherein the CSN provides internet content to the mobile station through the ASN,
wherein the CSN comprises a Quality of Service (QoS) database, wherein the QoS database comprises all policies of mobile stations subscribed to the CSN, wherein the policies comprise information required to create/modify service flows to the mobile stations,
wherein the ASN comprises a service flow authority (SFA) component comprising a local QoS database, wherein the local QoS database comprises QoS profiles from the QoS database, wherein in response to a service request from the mobile station, the SFA component is configured to determine how to or whether to authorize service to the mobile station based on the local QoS database,
wherein the ASN comprises a base station configured to wirelessly exchange data with the mobile station, and wherein the base station comprises a service flow management component configured for creation, admission, activation, modification, and deletion of service flows based on authorization from the SFA component.

25. The communication network system of claim 24, wherein the local QoS database is configured to obtain the QoS profiles from the QoS database of the CSN.

26. The communication network system of claim 24, wherein the local QoS database is configured to periodically update the QoS profiles from the QoS database of the CSN.

27. The communication network system of claim 24, wherein the ASN is configured to exchange information with the CSN, and wherein the ASN is capable of providing internet access to the mobile station through the CSN.

28. The communication network system of claim 24, wherein the data exchanged with the mobile station comprises voice data.

29. The communication network system of claim 24, wherein the data exchanged with the mobile station comprises IP data.

30. A base station comprising:
a network interface configured to provide wireless access to a mobile station, wherein the mobile station is a subscriber of a service provider,
wherein a network of the service provider forms a connectivity service network (CSN), wherein the CSN provides internet content to the mobile station through the base station,
wherein the CSN comprises a Quality of Service (QoS) database, wherein the QoS database comprises all policies of mobile stations subscribed to the CSN, wherein the policies comprise information required to create/modify services flows to the mobile stations,
wherein the base station comprises a service flow management component configured for creation, admission, activation, modification, and deletion of service flows based on authorization from a service flow authority (SFA) component,
wherein the SFA component comprises a local QoS database, wherein the local QoS database comprises QoS profiles from the QoS database, wherein the SFA component is located in a local network comprising the base station, wherein the local network is different from the CSN, wherein, in response to a service request from the mobile station, the SFA component is configured to determine how to or whether to authorize service to the mobile station based on the local QoS database.

31. The base station of claim 30, wherein the local QoS database is configured to obtain the QoS profiles from the QoS database of the CSN.

32. The base station of claim 30, wherein the local QoS database is configured to periodically update the QoS profiles from the QoS database of the CSN.

33. The base station of claim 30, wherein the ASN is configured to exchange information with the CSN, and wherein the ASN is capable of providing internet access to the mobile station through the CSN.

34. The base station of claim 30, wherein the wireless access to the mobile station comprises voice data access.

35. The base station of claim 30, wherein the wireless access to the mobile station comprises IP data access.

* * * * *